US009225707B1

(12) United States Patent
de Sousa et al.

(10) Patent No.: US 9,225,707 B1
(45) Date of Patent: Dec. 29, 2015

(54) CLOUD COMPUTING AND INTEGRATED CLOUD DRIVE

(71) Applicant: GOOGLE INC., Mountain View, CA (US)

(72) Inventors: Renato de Sousa, Kirkland, WA (US); James Weatherall, Kirkland, WA (US); Stephen John Konig, Newcastle, WA (US); Gary Kacmarcik, Bothell, WA (US); Alex Pakhunov, Kirkland, WA (US)

(73) Assignee: Google Inc., Mountain View, CA (US)

( * ) Notice: Subject to any disclaimer, the term of this patent is extended or adjusted under 35 U.S.C. 154(b) by 53 days.

(21) Appl. No.: 14/145,232

(22) Filed: Dec. 31, 2013

(51) Int. Cl.
*H04L 29/06* (2006.01)
(52) U.S. Cl.
CPC ...................................... *H04L 63/08* (2013.01)
(58) Field of Classification Search
CPC ..... H04L 63/00; H04L 63/08; H04L 63/0815; H04L 63/083; H04L 63/0884; G06F 9/45533; G06F 9/45558
USPC ........................................................... 726/5
See application file for complete search history.

(56) References Cited

U.S. PATENT DOCUMENTS

| 8,014,615 | B2 | 9/2011 | Uro | |
|---|---|---|---|---|
| 8,352,941 | B1 * | 1/2013 | Protopopov et al. | 718/1 |
| 2011/0047546 | A1 * | 2/2011 | Kivity et al. | 718/1 |
| 2011/0213691 | A1 * | 9/2011 | Ferris et al. | 705/37 |
| 2013/0016966 | A1 | 1/2013 | Jansen et al. | |
| 2013/0130683 | A1 | 5/2013 | Kruka | |

OTHER PUBLICATIONS

Williams, "Amazon Launches WorkSpaces, A Virtual Desktop Service on AWS", http://techcrunch.com/2013/11/13/amazon-launches-workspaces-a-virtual-desktop-service-on-aws/, Nov. 13, 2013, 4 pages.
"Amazon WorkSpaces", retrieved on Nov. 13, 2013, from http://aws.amazon.com/workspaces/, 3 pages.
"Amazon WorkSpaces Product Details", retrieved on Nov. 13, 2013, from http://aws.amazon.com/workspaces/details, 5 pages.
"Alpha Channel", retrieved on Jul. 16, 2012 from http://wiki.webmproject.org/alpha-channel, 5 pages.
"Alpha compositing", Wikipedia, the free encyclopedia, retrieved on Jul. 16, 2013 from http://en.wikipedia.org/wiki/Alpha_compositing, 6 pages.

(Continued)

*Primary Examiner* — Yogesh Paliwal
(74) *Attorney, Agent, or Firm* — Brake Hughes Bellermann LLP

(57) ABSTRACT

A method includes receiving, by an orchestrator component from a client computer, a request to activate an application in a cloud. The orchestrator component is a part of a cloud computing infrastructure hosted on a network connected to the client computer. The request to activate the application includes user credentials for access to user accounts including a user account with a cloud storage that stores a file for the user. The method further includes sending, by the orchestrator component to an application VM executing an instance of the application in the cloud, the user credentials specifically for access by the application VM to the user's account with the cloud storage drive. The method additionally includes using the user credentials to access the file stored in the cloud storage as and when needed for processing the file by the instance of the application executing in the application VM in the cloud.

18 Claims, 5 Drawing Sheets

(56) References Cited

OTHER PUBLICATIONS

"Citrix Streamlines Delivery of Cloud-Hosted Apps and Desktops", Citrix Systems, Inc., Mar. 19, 2012, 2 pages.

"RGBA color space", Wikipedia, the free encyclopedia, retrieved on Jul. 16, 2013 from http://en.wikipedia.org/wiki/RGBA_color_space, 3 pages.

* cited by examiner

410
Receiving, by an orchestrator component from a client computer, a request to activate an application in the cloud

412
Activating a corresponding application stub on the client computer, which may result in user authentication with an identity provider and receiving by the client computer one or more security access tokens (e.g., OAuth tokens) that can be used, in lieu of explicit user authentication, for access to user accounts

414
Receiving, by the orchestrator component, an application ID from the application stub

420
Obtaining, by the orchestrator component from an application data base, requirements and specifications for implementing an application virtual machine (VM) capable of executing an instance of the application

430
Sending, by the orchestrator component to a VM manager, a request to implement the application virtual machine (VM) capable of executing an instance of the application

440
Implementing, on the cloud infrastructure by the VM manager, the application VM for executing an instance of the application

450
Receiving from the client computer by the application VM, the user credentials (e.g., security access token) specifically for fetching a file from the user's account with the cloud storage for processing by the instance of the application executing in the application VM

460
Synchronizing the file processed by the instance of the application executing in the application VM with the cloud storage

FIG. 4   400

CLOUD COMPUTING AND INTEGRATED CLOUD DRIVE

BACKGROUND

Personal computing devices (e.g., smartphone, laptop, tablet or notebook computer, etc.) are ubiquitous, but may not have computing power or capabilities sufficient to meet every computing need of a user. A user may still rely on natively-operating applications executing in a high power desktop or server environment for certain computing needs (e.g., computer-aided design, image processing, numerical simulations, etc.) that involve execution of processor-intensive or data-intensive computing applications (e.g., computer-aided design applications, image processing applications, numerical simulators, etc.).

A need exists for providing processor-intensive or data-intensive computing capabilities to a personal computing device by exploiting, for example, cloud computing arrangements or architectures involving network-based applications for processing user data, documents or files.

SUMMARY

This disclosure generally relates to cloud computing arrangements and services.

In a general aspect, a method includes receiving, by an orchestrator component from a client computer, a request to activate an application in the cloud. The request includes an application ID corresponding to the application. The method further involves obtaining, by the orchestrator component from an application data base, requirements and specifications for implementing an application virtual machine (VM) capable of executing an instance of the application. The method further involves sending, by the orchestrator component to a VM manager, a request to implement the application virtual machine (VM) capable of executing the instance of the application.

In a further aspect, the method involves implementing, on the cloud infrastructure by the VM manager, the application VM for executing an instance of the application, and receiving from the client computer by the application VM, a user credential for fetching a file from the user's account with the cloud storage for processing by the instance of the application executing in the application VM.

In a general aspect, a cloud computing infrastructure system includes an orchestrator component configured to receive from a client computer a request of a user to activate an application in a cloud computing infrastructure hosted on a network connectable to the client computer. The request includes user credentials for access to one or more user accounts (e.g., a user account with a cloud storage drive, which stores a file for the user). The user credentials may include credentials (e.g., access tokens), which can be used in lieu of explicit user authentication for access to the one or more user accounts. The orchestrator component is further configured to send a request to a virtual machine (VM) manager to implement an application VM capable of executing an instance of the application in the cloud.

In a general aspect, a method includes receiving, by an orchestrator component from a client computer, a request to activate an application in a cloud computing infrastructure hosted on a network connected to the client computer, the request includes user credential for access to one or more user accounts including, for example, a user account with a cloud storage storing a file. The method involves sending from the orchestrator component to a virtual machine (VM) manager, a request to implement an application VM capable of executing an instance of the application in the cloud computing infrastructure. The VM manager implements an application VM capable of executing the instance of the application in the cloud computing infrastructure. The method further involves the application VM receiving the user credential (e.g., an access token) specifically for access by the instance of the application executing in the application VM to the user account with the cloud storage. The method involves using the user credential (which may be received directly from the client computer or via the orchestrator component), in lieu of explicit user authentication, to access the cloud storage to access the file stored therein as and when needed for processing the file by the instance of the application executing in the application VM.

BRIEF DESCRIPTION OF THE DRAWINGS

FIG. 4 is an illustration of another example method for integrating a cloud storage with a cloud computing service for a client computing device, in accordance with the principles of the disclosure herein.

Like reference symbols in the various drawings indicate like elements.

DETAILED DESCRIPTION

For convenience in description, the terms "cloud," "cloud-based," "network," and "network-based" may be used interchangeably herein. Further, data in whatever form (e.g., tables, textual data, numerical data, web pages, files, etc.) processed or consumed by an application may be referred to herein as a "document" or "file." Processing of data by an application may be referred to herein as "opening a document" or "opening a file" by the application.

Cloud-based or network-based computing is a type of computing that relies on sharing computing resources over the web or a network rather than relying on local resources (e.g., local servers or personal devices) to handle applications. Different services or resources (e.g., servers, storage, drives, data, and applications) can be delivered over the web to a user, for example, via a web browser. A user may have one or more accounts with service providers to avail of the different cloud-based or network-based services or resources.

Under a cloud computing paradigm, a client computing device (e.g., smartphone, laptop, tablet or notebook computer) may be configured with computing capabilities via a cloud-based or network-based service (hereinafter "cloud-computing service"), which may be subscription based. Computing programs or applications (e.g., computer-aided design applications, image processing applications, numerical simulators, etc.) required for the subscription-based service may be hosted and executed on one or more remote servers that are located in the cloud. The data, documents or files processed or consumed by the cloud-based or network-based applications may be stored locally (e.g., on the client computer's hard drive) or stored in a network file storage or cloud storage system, which may be maintained by a third party.

Figure 1:
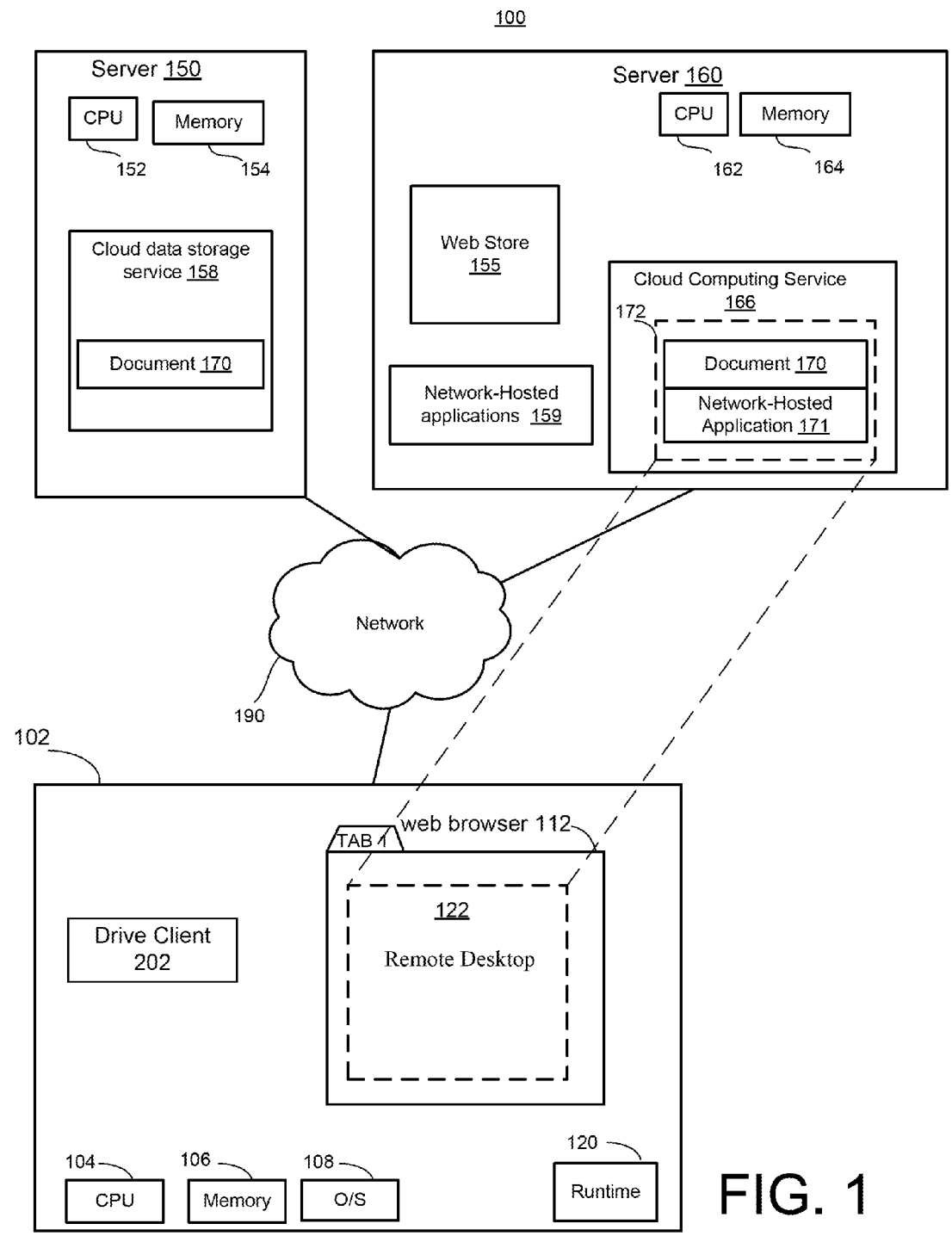
FIG. 1 is a schematic illustration of an example system that may be used to implement a cloud computing service for a client computing device, in accordance with the principles of the present disclosure.

FIG. 1 is a schematic block diagram of an example system 100 that may be used to implement a cloud computing service for a local personal computing device 102, in accordance with the principles of the present disclosure.

In various implementations, system 100 may include one or more personal computing devices 102 (such as desktop computers, notebook computers, netbook computers, tablet computers, smart-phones, etc.) that are communicatively linked to one or more physical or virtual servers (e.g., server 150, etc.) hosted on a network 190.

A personal computing device 102 may include one or more processors (e.g., CPU 104), one or more memories 106, and an operating system (e.g., O/S 108) designed to work primarily with web apps. Operating System (O/S) 108 may, for example, be the Chrome operating system. Such a personal computing device, which may be referred to as a web thin client, may only provide a web browser 112, and generally rely on web applications (downloaded, for example, from a web store 155 on server 150) to provide local general-purpose computing functionality. Computing device 102 may execute a runtime 120 and various web applications (not shown), for example, in a tab of web browser 112, which may be provided by O/S 108.

As noted above, computing device 102 may be communicatively linked to one or more servers (e.g., servers 150) on network 190. Server 150 and server 160 may each include one or more CPUs and memories (e.g., CPU 152 and Memory 154, and CPU 162 and Memory 164, respectively). Server 150 may also host or support a public or private cloud data storage service 158. Cloud data storage service 158 may store user data, documents and files (e.g., document 170) in a secure cloud storage account of a user of computing device 102.

Cloud data storage service 158 may support an interface component (e.g., drive client 202) in computing device 102 through which the later may upload data, documents, or files stored in a user's account with the cloud data storage service 158. In traditional implementations, drive client 202 software runs on computing device 102 for cloud data storage service 158 to synchronize files between computing device 102 and cloud data storage computing device 102 and cloud data storage.

Drive client 202 may synchronize all data, documents or files in a local directory on computing device 102 with what is stored in cloud data storage service 158. Drive client 202 software may allow a user of computing device 102 to access or process data, documents or files physically residing in cloud data storage service 158 on remote server 150 as if they were physically residing on computing device 102.

Further, server 160 may host or support a cloud computing service module 166. Cloud computing service module 166 may be configured to provide cloud computing capability to computing device 102. Cloud computing service module 166 may be configured to open or process a user-selected file or document (e.g., document 170) with a selected network-hosted application (e.g., network-hosted application 171) on server 160 in a server runtime 172. Cloud computing service module 166 may be further configured to project at least a view of server runtime 172 as a remote desktop 122 on computing device 102. A user may be able to initiate, monitor, or interact with the opening or processing of document 170 by network-hosted application 171 in server runtime 172 via remote desktop 122.

In an example implementation of the cloud computing capability, a user wanting to open or process document 170 on server 150 may, for example, have to first download document 170 from cloud storage service 158 on remote server 150 to computing device 102 and then upload document 170 to cloud computing service module 166 on server 160. This manner of user-mediated file or document transfers may be inconvenient to the user and may further result in different versions of the files or documents (e.g., document 170) on different machines (e.g., server 150 and server 160) in the system.

System 100 may further include a public or private web store (e.g., web store 155) hosted on a server from which a user may subscribe to one or more network-hosted applications 159. For economy in the figures, FIG. 1 shows example web store 155 hosted on server 160. However, in implementations of system 100, web store 155 may be hosted on server 160 or any other server in system 100.

In accordance with the principles of the present disclosure, a cloud computing system, which supports a cloud computing service for a client computing device, includes an orchestrator component configured to manage and co-ordinate the operation of servers and other cloud-computing infrastructure components involved in executing network-hosted applications for the client computing device. The orchestrator component may supervise authentication processes and manage access for the network-hosted applications to a user's protected data in cloud storage system and integrate the cloud storage system with execution of the network-hosted applications for the client computing device. For user authentication with a remote host executing network-hosted application for the client computing device, the orchestrator component may generate an authorization code and a shared secret, and send both to the client computing device. The client computing device may send the authorization code to the remote host, which in turn may send the authorization code to the orchestrator component and obtain the shared secret from the orchestrator component. The client computing device and the remote host may mutually authenticate each other using the shared secret.

Figure 2:
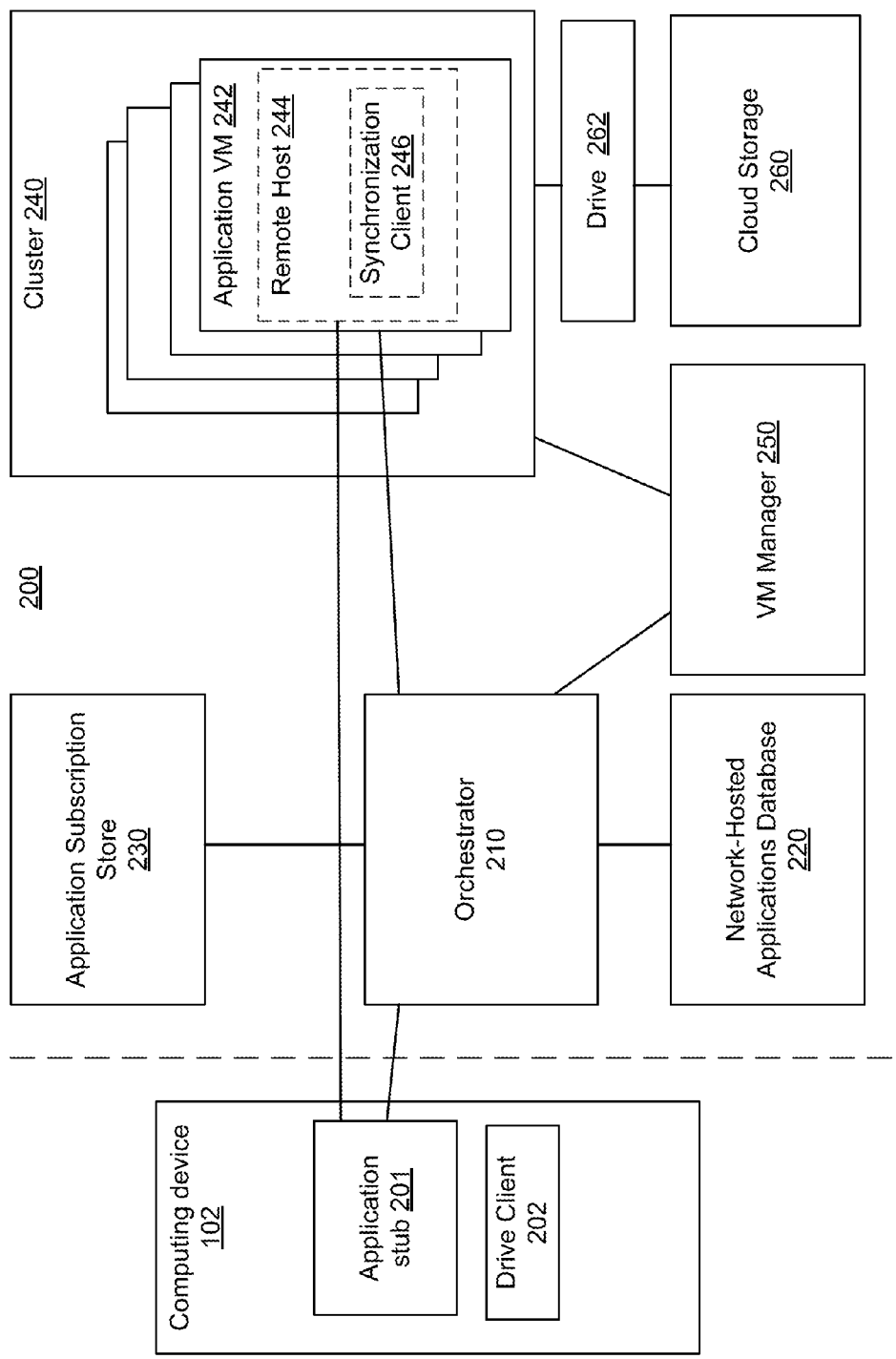
FIG. 2 is a schematic block diagram illustration of an example system that integrates a cloud storage with a cloud computing service for a client computing device, in accordance with the principles of the present disclosure.

FIG. 2 is a schematic block diagram of an example cloud computing system 200 hosted on a network (e.g., network 190), in accordance with the principles of the disclosure herein. Cloud computing system 200 may include an orchestrator component 210 configured to co-ordinate or synchronize the operation of network-hosted servers and other cloud-computing infrastructure components involved in executing a network-hosted application on the network for a client computing device (e.g., computing device 102). The network hosted-application, which may be executed in an application virtual machine (VM) (e.g., application VM 242) on the network, may be represented by a corresponding application stub (e.g., application stub 201) on computing device 102. Application stub 201 may be a small program routine on computing device that substitutes for and provides a connection to the remotely-located network-hosted application. A user may use application stub 201 to call the corresponding network hosted-application via orchestrator component 210 to process, for example, a user document stored in a cloud storage service (e.g., cloud-storage drive 260) with which a user may have a secure user account to store data, documents or files.

In addition to orchestrator component 210, cloud computing system 200 may, for example, include a network-hosted applications database 220, an application subscription service or store 230, and a cluster of servers (e.g., cluster 240). Cluster 240 may host one or more instances of application VM 242 corresponding to the network-hosted application.

Token-based authentication and authorization protocols (e.g., OAuth 2.0) may be implemented in cloud computing system 200, for example, by the orchestrator component 210, for access to user accounts with cloud-storage drive 260 or other services (e.g., application subscription store 230). For security, user approval or authorization may be required before granting an entity, for example, a third party, access to the user-owned data in the user's cloud- or network-based account. Common web authorization protocols (e.g., OAuth 1.0 and OAuth 2.0) allow a user to grant a third-party access to the user's data in the user's cloud-based or network-based accounts, without having to reveal or share the user's account login credentials (e.g., password) with the third party. Once the third party is granted access by the user, the third party may receive an access token that it may use (instead of the user's account login credentials) to repeatedly access the user-owned data in the user account. Here, cloud computing system 200/orchestrator component 210/application VM 242 may be treated as the third party under the token-based authentication and authorization protocols.

Implementation of the authentication and authorization protocols may involve an identity provider (not shown). For access to the user's account, cloud computing system 200/ orchestrator component 210 may require the user to authenticate with the identity provider and to grant access. Once the user has granted access, cloud computing system 200/orchestrator component 210 may request an access token (e.g., an OAuth access token) from the identity provider that can be used, in lieu of explicit user authentication, for calls to the user's accounts.

In system 200, network-hosted applications database 220 may be a repository of various network-hosted applications that may be available to users (e.g., via a web store) for processing data on the network. Application subscription store 230 may be configured to allow a user (e.g., of computing device 102) to subscribe for use of a particular application in network-hosted applications database 220. The user may download an application stub (e.g., application stub 201) for the particular application from application subscription store 230 for installation on computing device 102. The downloaded application stub may be bundled with an application subscription and associated, for example, with an application ID and a subscription ID.

Further, in system 200, cluster 240 may be any arrangement of one or more servers or other hardware configured to host one or more process or application virtual machines (e.g., application VM 242). In example implementations of system 200, cluster 240 and the application VMs may be sourced from different public and/or private providers (e.g., BigCluster, Amazon EC2, private pool, etc.).

Application VM 242 may run as a normal application inside a host OS and support a single process. Application VM 242 may provide a process independent programming environment that abstracts away details of the underlying hardware or operating system, and allows a program to execute in the same way on any platform. Application VM 242 may generate or include a remote host 244 (e.g., a Chromoting Host) which may provide users with remote access to application VM 242 and any application or process executed therein.

Application VM 242 may be associated with a VM identifier and characterized by VM size and resource specifications including, for example, one or more of CPU, RAM, disk, bandwidth, GPU, etc.

System 200 may be configured so that a VM can be set-up quickly on cluster 240, in response a user's request for an application process. Alternatively or additionally, cluster 240 may host a pool of VMs that are already set-up and executing. An appropriately-sized and resourced VM instance from the pool may be selected and made available in response to the user's request for the application process.

System 200 may further include one or more virtual machine managers (e.g., VM manager 250) to control and manage application VMs 242 hosted on cluster 240. VM 250 manager may be configured to allow user/administrators, for example, to create, edit, start and stop VMs, view and control of each VM's console, see performance and utilization statistics for each VM, view executing VMs and hosts and their live performance and resource utilization statistics, etc. VM manager 250 may have different functionalities for different VM providers (e.g., BigCluster, EC2, private pool). An example VM manager may include data on each VM currently executing in cluster 240. The data may, for example, include VM identifiers, VM size and resources specification (e.g., CPU, RAM), VM IP addresses, remote host identifier, etc.

As previously noted, orchestrator component 210 may configured to co-ordinate or synchronize the operation of system 200 components (e.g., network-hosted applications database 220, application subscription store 230, VM manager 250, cluster 240 and cloud storage 260) for executing a network-hosted application on the network for a client computing device. For this purpose, orchestrator component 210 may, for example, be configured to handle requests for applications by application stubs (e.g., application stub 201), verify a user's application subscriptions with an application subscription service or store (e.g. application subscription store 230), manage pools of VM hardware with different capabilities (e.g., cluster 240), and manage a directory of available applications and application VM base images (e.g., applications database 220).

Orchestrator component 210 may be further configured to configure application VMs (e.g., application VM 242) with user credentials and/or configure new application VMs with per-instance credentials and to configure persistence of application metadata to the user's drive (e.g., cloud storage 260).

The operation and functions of orchestrator component 210 in an example implementation of system 200 may be further understood by considering an example scenario in which a user of computing device 102 requests a network-hosted application to process a document or file.

In the example scenario, the user may download and install an application stub (e.g., application stub 201) corresponding to the network-hosted application from application subscription store 230 on computing device 102. The user may initiate a request for the network-hosted application by activating application stub 201, which may cause an identity API (not shown) on computing device 102 to obtain a security access tokens (e.g., OAuth tokens) from an identity provider following established authentication and authorization protocols (e.g., OAuth 2.0 protocol). The OAuth tokens may include appropriate permissions for access to the user's accounts with various service providers (e.g., cloud storage, e-mail, web store subscriptions, etc.). Application stub 201 may send the OAuth tokens together with the user's request for the network-hosted application to orchestrator component 210.

An example request sent across an application stub-orchestrator interface to orchestrator component 210 may include an application ID, a subscription ID, and user identity (OAuth token). The orchestrator component's response to computing device 102 (after processing the request and establishing a host (e.g., remote host 244) to execute the network-hosted application) may include, for example, a host identifier (Jabber ID or other ID) and an orchestrator component-generated authentication secret (with expiration) that may be used for client computer-host authentication processes.

For processing the request of the user, orchestrator component 210 may check (e.g., verify) with application subscription store 230 if the subscription of the user for the network-hosted application is active and if there are any conditions (e.g., time or usage limits) on the subscription.

An example check request sent across the orchestrator-subscription store interface by the orchestrator component 210 to subscription store 230 may include a subscription ID and user identity (OAuth token). The subscription store's response may indicate if the subscription of the user is active and include information on any conditions on the subscription (e.g., the metered usage still left in the subscription, wall clock time of the subscription (e.g., subscribed until the end of the month, regardless of usage), usage time limits in the subscription (e.g., 3 more hours of xyz application use), etc.).

Orchestrator 210 may next request information from network-hosted application database 220 to select which application VM manager of the one or more VM managers (which may be sourced from different providers) in system 200 should process the user's request for a network-hosted application. The selection may be based, for example, on the application ID and subscription ID. The information returned by network-hosted application database may, for example, include a VM manager's address (e.g., application VM manager 250), an implementation-specific VM identifier (which may encode or map to a VM image, setup instructions, implementation details, etc.), and VM size and resource specifications (e.g., CPU, RAM, disk, bandwidth, GPU, etc.).

Based on the information returned by network-hosted application database 220, orchestrator component 210 may request that the selected VM manager (e.g., application VM manager 250) setup or provide an application VM/remote host (e.g., application VM 242/remote host 244) in cluster 240 to execute the network-hosted application according to the user's request. Orchestrator component 210 may be configured to prove an identity of the orchestrator component 210 to the selected VM manager (which may be sourced from a third party) using, for example, a crypto-signature. Further, orchestrator component 210 may be configured to generate the shared authentication secret for client computer-host authentication processes.

An example request sent across an orchestrator-VM manager interface by the orchestrator component 210 to VM manager 250 may, for example, include application subscription details, an OAuth token for drive connector/proxy, an OAuth token for the host, and the crypto-signature proving orchestrator component 210 identity.

In response, VM manager 250 in system 200 may set up a VM (e.g., application VM 242) and initiate remote host 244 in the VM on cluster 240. Remote host 244 when up and executing in the VM may synchronize with orchestrator component 210, for example, by sending synchronization signals (e.g., "heartbeat" signals) to the latter.

Next, as noted previously, orchestrator component 210 may be configured to respond to computing device 102/application stub 201 (after processing the request and establishing remote host 244 to execute the network-hosted application) with a host identifier (Jabber ID or other ID) and an authentication secret with expiration. Computing device 102/application stub 201 may then use a signaling channel to authenticate with remote host 244, negotiate transport channels, and establish a session. Computing device 102/application stub 201 may connect to remote host 244 over a direct channel using, for example, a messaging service.

In system 200, data, documents, or files processed by the network-hosted application executing in application VM 242 may be downloaded to the VM environment as needed cloud storage 260, for example, via a drive 262. Application VM 242 may access secure user data, documents or files via drive 262 only after establishing user credentials. Application VM 242/remote host 244 may use the OAuth token provided by the orchestrator component 210, in lieu of explicit user authentication, to establish the user credentials required for access. After the user credentials are established, application VM 242/remote host 244 may pull down a file from drive 262 to the VM environment as and when the network-hosted application executing in application VM 242 needs the file. For example, when a user attempts to edit a particular file with the network-hosted application on remote host 244, application VM 242 may pull the particular file down from cloud storage 260 to the VM environment.

Changes made to the data, documents, or files processed by the network-hosted application executing in application VM 242 may be automatically fed back or synchronized to cloud storage 260. Conversely, changes to the data, documents, or files in cloud storage 260 may be automatically synchronized down to the VM environment.

It will be noted that in an example implementation of system 200, only cloud storage meta data (instead of all user files in a local directory) may be synchronized down to a local storage or drive on computing device 102. In such a system 200, a user on computing device 102 can choose a particular file to open or process based on the meta data and then system 200 may request or fetch the contents of the particular file from cloud storage 260 "on demand" for opening or processing, for example, in application VM 242. For this purpose, remote host 244 may include a synchronization client 246, which may have functions similar to the functions of drive client 202 on computing device 102. Synchronization client 246 may allow remote host 244 to access or process data, documents or files physically residing in cloud storage 260. In such a system 200, it may not be necessary or required to synchronize all of the user's files from cloud storage to computing device 102. Only the particular file selected by the user may be fetched on demand from cloud storage 260. In some implementations of system 200, synchronization client 246 may be configured to request or pre-fetch file contents of one or most recently used or one or more frequently used files It will be understood that FIGS. 1 and 2 show a particular distributions or arrangements of components (i.e. web store 155, public or private cloud data storage service 158, one or more network-hosted applications 159, cloud computing service module 166, etc.) only for purposes of example illustrations of system 100 and system 200. Various other implementations of system 100 and 200 may have other distributions or arrangements of the components, which may be hosted on one or more physical or virtual servers on network 190, and may involve fewer or more components than shown in either FIG. 1 or FIG. 2.

Figure 3:
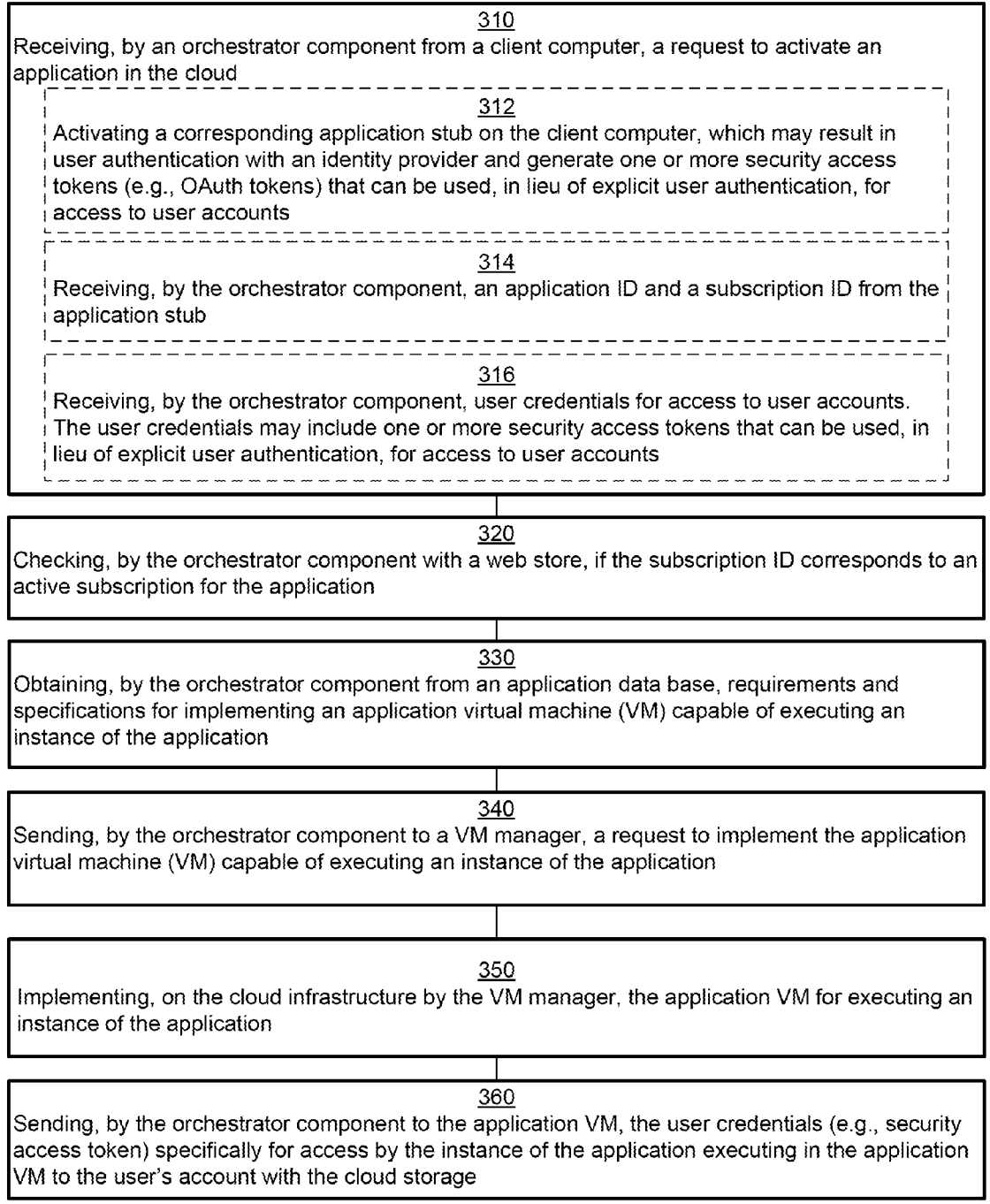
FIG. 3 is an illustration of an example method for integrating a cloud storage with a cloud computing service for a client computing device, in accordance with the principles of the disclosure herein.

FIG. 3 shows an example method 300 for integrating a cloud storage with cloud computing capability for a client computing device (e.g., a laptop computer, a notebook computer, a tablet computer, a smart-phone, etc.). The client computing device may be configured with an operating system (e.g., Chrome operating system) and may be designed to work primarily with web apps. Such a client computing device, may only provide a web browser, and rely on web applications to provide general-purpose computing functionality.

The cloud computing capability provided by method 300 to the client computing device may involve opening or processing a file or document with a network-hosted application in an application virtual machine (VM) hosted in the cloud. The application may be a network-hosted application available from a web store by user-subscription. The user may, for example, download and install an application stub on the client computer to connect to or access the application on the network. Further, the file or document may, for example, be a file or document that is securely stored in a user's account in the cloud storage drive. Further, the application VM may host a remote desktop through which the user may initiate, interact or monitor processing of the file or document as if it were being opened or processed on the client computer itself.

Method 300 includes receiving, by an orchestrator component from the client computer, a request to activate an application in the cloud (310). The orchestrator component may be a part of a cloud computing infrastructure hosted on a network connected to the client computer. The application may be a network-hosted application available from a web store by user-subscription.

In method 300, receiving the request 310 may be preceded by activating a corresponding application stub on the client computer, which may result in user authentication with an identity provider and generate one or more security access tokens (e.g., OAuth tokens) that can be used, in lieu of explicit user authentication, for access to user accounts (312). Receiving the request 310 may include receiving, by the orchestrator component, an application ID and a subscription ID (314), and receiving, by the orchestrator component, user credentials for access to user accounts (316). The received user credentials may include one or more security access tokens (e.g., OAuth tokens) that can be used for access to user accounts including a user account with a cloud storage storing the file or document for the user.

Method 300 may further include checking, by the orchestrator component with the web store, if the subscription ID corresponds to an active subscription for the application (320), and if the subscription for the application is active, obtaining, by the orchestrator component from an application data base, requirements and specifications for implementing an application virtual machine (VM) capable of executing an instance of the application (330). The obtained requirements and specifications may include information on setup instructions, implementation details, required VM resources and specifications (e.g., VM size: CPU, RAM, disk size, bandwidth, GPU, etc.), and identification of a VM manager for implementing the application VM.

Method 300 may further include sending, by the orchestrator component to the VM manager, a request to implement the application virtual machine (VM) capable of executing an instance of the application (340). The request passed to the VM manager by the orchestrator component may include one or more of application subscription details. The request passed to the VM manager may also include authentication (e.g., a crypto signature) of the orchestrator component's identity to the application VM manager.

Further, sending a request, by the orchestrator component to the VM manager, to implement the application VM capable of executing an instance of the application 340 may include sending a security access token (e.g., OAuth token) specifically for access by the application VM to the user's account with the cloud storage (342). The application VM may be connected to the cloud storage drive, for example, via a drive connector/proxy.

Method 300 may further include implementing, on the cloud infrastructure by the VM manager, the application VM for executing an instance of the application (350), and sending, by the orchestrator component to the application VM, the user credentials (e.g., security access token) specifically for access by the instance of the application executing in the application VM to the user's account with the cloud storage (360). Further, method 300 may include using the user credentials (e.g., security access token) in lieu of explicit user authentication to access the cloud storage to retrieve or store the file or document as and when needed for opening or processing by the instance of the application executing in the application VM.

In method 300, the orchestrator component may be used as an intermediary to pass security access tokens (e.g., OAuth tokens), which the client computer receives from the identity provider, to one or more service providers (e.g., application web stores, cloud storage, etc.) for accessing user accounts with the one or more service providers.

FIG. 4 shows an example method 400 in which the orchestrator component sets up the application VM and facilitates client computer-host authentication, while the client computer itself passes security access tokens (e.g., OAuth tokens), which the client computer receives from the identity provider, directly to one or more service providers (e.g., application web stores, cloud storage, etc.) for accessing user accounts with the one or more service providers.

Method 400, like method 300, includes receiving, by an orchestrator component from a client computer, a request to activate an application in the cloud (410). The receiving of the request by the orchestrator component may be preceded by activating a corresponding application stub on the client computer, which may result in user authentication with an identity provider and generate one or more security access tokens (e.g., OAuth tokens) that can be used, in lieu of explicit user authentication, for access to user accounts (412). Receiving the request 410 may include receiving, by the orchestrator component an application ID (414).

Method 400, may further include obtaining, by the orchestrator component from an application data base, requirements for implementing an application virtual machine (VM) capable of executing an instance of the application (420), sending, by the orchestrator component to a VM manager, a request to implement the application virtual machine (VM) capable of executing an instance of the application (430) and implementing, on the cloud infrastructure by the VM manager, the application VM for executing an instance of the application (440).

Method 400 may also include receiving from the client computer by the application VM, the user credentials (e.g., security access token) specifically for fetching a file from the user's account with the cloud storage for processing by the instance of the application executing in the application VM (450) and synchronizing the file processed by the instance of the application executing in the application VM with the cloud storage (460).

A computer system (e.g., system 200) may be deployed to practice methods 300 and/or 400 in conjunction with a non-transitory computer-readable storage medium having instructions stored thereon. The instructions when executed by one or more microprocessors may cause the computer system to establish a Filename Extension—Applications registry and make such registry available to a cloud computing service for a personal computing device as described above with reference to FIGS. 1-3.

Figure 5:
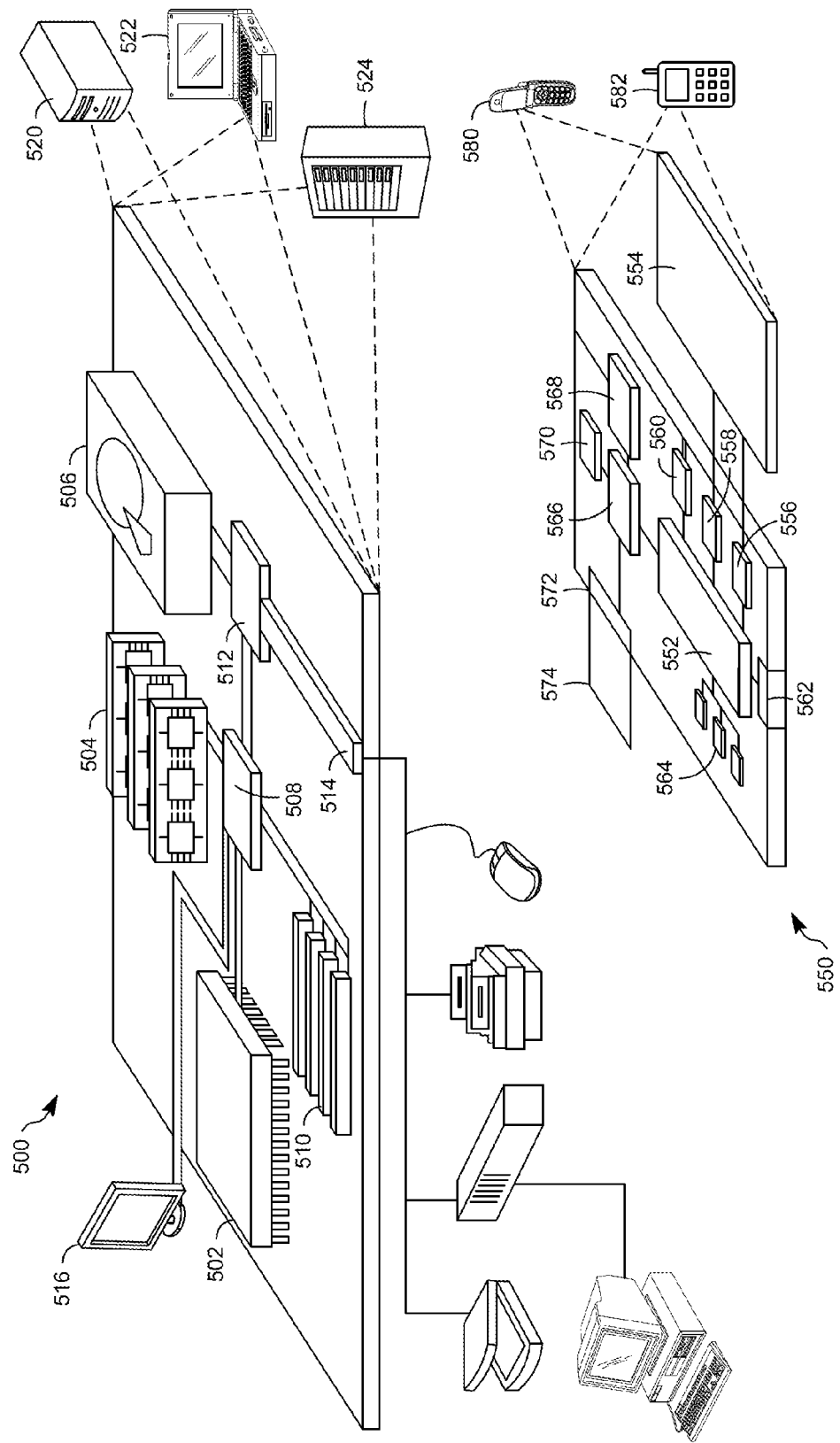
FIG. 5 is a schematic illustration of a generic computer device and a generic mobile computer device, which may be used with the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, and an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning System) receiver module 570 may provide additional navigation- and location-related wireless data to device 550, which may be used as appropriate by applications executing on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs executing on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:

receiving, by an orchestrator component from a client computer, a request to activate an application in a cloud computing infrastructure hosted on a network connected to the client computer, the request including a user credential for access to at least an account of the user including a user account with a cloud storage, the cloud storage storing a file associated with the user account;

sending from the orchestrator component to a virtual machine (VM) manager, a request to implement an application VM capable of executing an instance of the application in the cloud computing infrastructure implementing, by the VM manager, the application VM capable of executing the instance of the application in the cloud computing infrastructure, the application VM hosting a remote host in the application VM for the client computer; and sending, by the orchestrator component to the application VM, the user credential specifically for access by the instance of the application executing in the application VM to the user account with the cloud storage, including authenticating the remote host and generating a secret for authentication of the client computer with the remote host.

2. The method of claim 1, further comprising, using the user credential to access the cloud storage to access the file stored therein as and when needed for processing the file by the instance of the application executing in the application VM in the cloud.

3. The method of claim 1, wherein the application is available from a web store by user-subscription, and receiving by the orchestrator component from the client computer, includes receiving an application ID and a subscription ID.

4. The method of claim 3 further comprising, checking, by the orchestrator component with the web store, if the subscription ID corresponds to an active subscription for the application.

5. The method of claim 1 further comprising, obtaining, by the orchestrator component from an application data base, requirements and specifications for implementing an application virtual machine (VM) capable of executing the instance of the application in the cloud.

6. The method of claim 1, further comprising, sending, by the orchestrator component to a VM manager, a request to implement an application virtual machine (VM) capable of executing the instance of the application in the cloud.

7. The method of claim 6 further comprising, implementing, on the cloud computing infrastructure by the VM manager, the application VM capable of executing an instance of the application.

8. The method of claim 1, further comprising, using the user credential in lieu of explicit user authentication to access the cloud storage to access the file as and when needed for processing by the instance of the application executing in the application VM.

9. The method of claim 1, wherein the client computer and the at least an account of the user conform to a token-based authentication and authorization protocol, and wherein the user credential for access to user accounts includes one or more security access tokens.

10. The method of claim 1, wherein receiving, by the orchestrator component from the client computer, the request to activate the application includes receiving the request from an application stub corresponding to the application, the application stub installed on the client computer.

11. A system, comprising
an orchestrator component included in a cloud computing infrastructure hosted on a network, the orchestrator component in communication with a client computer;
a cluster of servers hosted on the network and in communication with the orchestrator component; and
a virtual machine (VM) manager included in the cloud computing infrastructure hosted on the network and in communication with the orchestrator component and the cluster of servers,
wherein the orchestrator component is configured to receive a user request from the client computer to activate an application in the cloud computing infrastructure hosted on the network connectable to the client computer, the request including a user credential for access to a user account with a cloud storage drive, the cloud storage drive storing a file for the user, and to send a request to the VM manager to implement an application VM capable of executing an instance of a corresponding application on the cloud computing infrastructure, and
wherein the application VM hosts a remote host for the client computer, and wherein the orchestrator component is configured to pass the user credential for the remote host to the application VM, to receive synchronization signals from the remote host, and to authenticate the remote host and generate a secret for authentication of the client computer with the remote host.

12. The system of claim 11, wherein the application is available from a web store by user-subscription, and wherein the orchestrator component is further configured to verify with web store, whether the user has an active subscription for the application.

13. The system of claim 11, wherein the orchestrator component is further configured to obtain from an application data base, requirements and specifications for implementing the application VM capable of executing the instance of the application in the cloud.

14. The system of claim 11, wherein the client computer and the account of the user conform to a token-based authentication and authorization protocol, and wherein the user credential received by the orchestrator component includes one or more security access tokens.

15. The system of claim 11, wherein the orchestrator component is configured to respond to the request to activate the application received from the client computer with a jabber ID (JID) of the remote host and the secret for authentication of the client computer with the remote host.

16. The system of claim 15, wherein an application stub corresponding to application is installed on the client computer, and wherein the orchestrator component is configured to connect to application stub and receive the request to activate the application from the application stub.

17. A method, comprising:
receiving, by an orchestrator component from a client computer, a request to activate an application in a cloud computing infrastructure hosted on a network connected to the client computer, the request including a user credential for access to at least an account of the user including a user account with a cloud storage drive, the cloud storage storing a file for the user;
sending, by the orchestrator component or the host computer to an application VM executing an instance of the application in the cloud, the user credential specifically for access by the application VM to the user account with the cloud storage drive, the application VM hosting a remote host for the client computer; and
authenticating, by the orchestrator component, the remote host and generating a secret for authentication of the client computer with the remote host.

18. The method of claim 17, further comprising, using the user credential, in lieu of explicit user authentication, to access the cloud storage to access the file stored therein as and when needed for processing the file by the instance of the application executing in the application VM in the cloud.

* * * * *